May 7, 1940.  G. L. SHERWOOD  2,199,680
SLED
Filed April 22, 1937   2 Sheets-Sheet 2

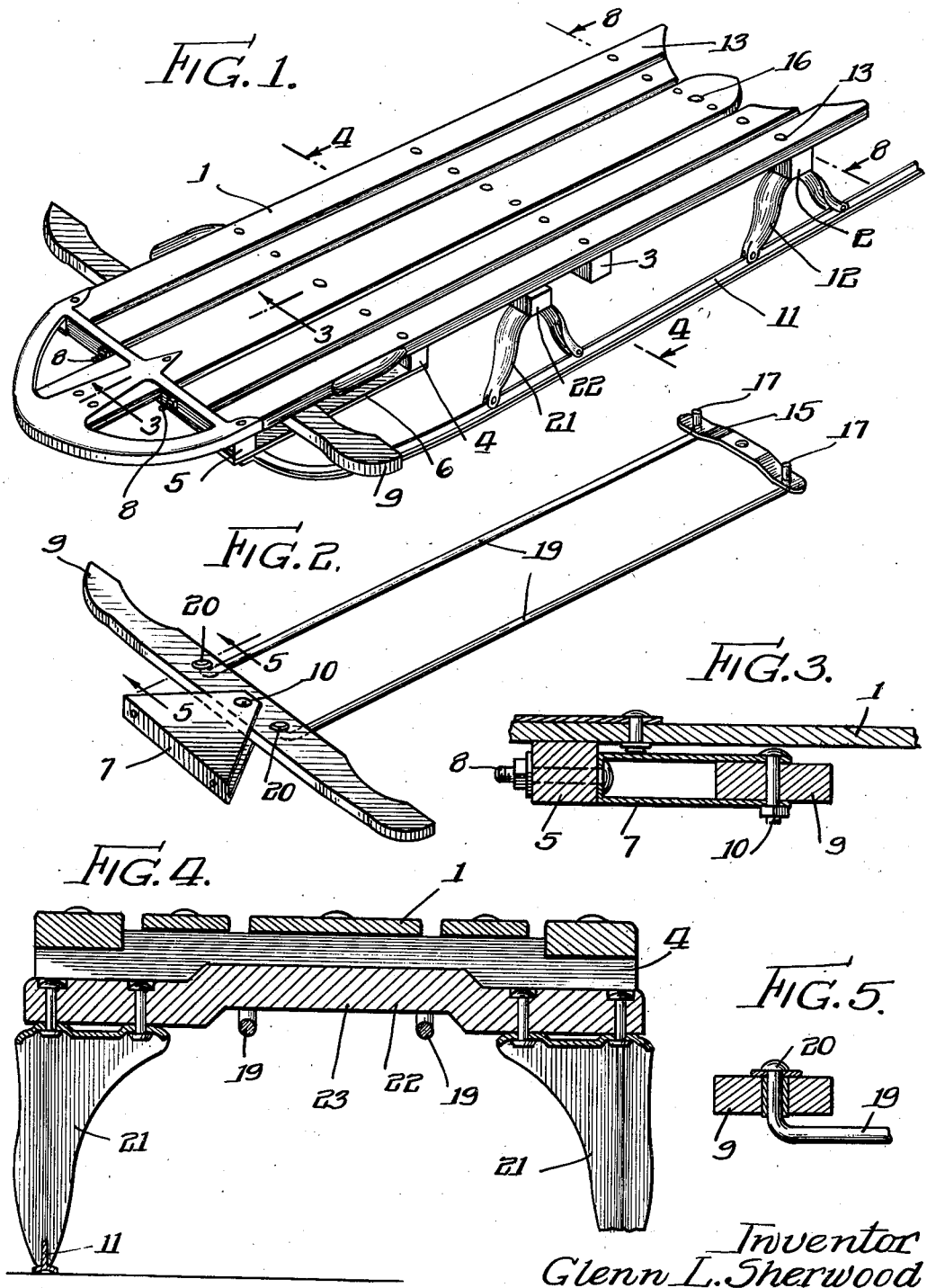

Inventor
Glenn L. Sherwood
By: Arthur F. Durand
Atty.

Patented May 7, 1940

2,199,680

UNITED STATES PATENT OFFICE 2,199,680

SLED

Glenn L. Sherwood, Benton Harbor, Mich., assignor to Kaywood Corporation, Benton Harbor, Mich., a corporation of Michigan Application April 22, 1937, Serial No. 138,323

17 Claims. (Cl. 280—22)

This invention relates to sleds, and more particularly to those that have flexible runners, with a steering gear for flexing the runners to steer the sled to the right or the left.

Generally stated, the object of the invention is to provide a novel and improved construction and arrangement whereby the rear portions of the runners are movably and pivotally connected to the body of the sled, and whereby the steering gear is connected rearwardly to the pivotal connection between the body and the rear portions of the runners, whereby the said rear end portions are flexed to the right or to the left, thereby to steer the sled.

It is also an object to provide certain details and features of construction tending to increase the general efficiency and desirability of a sled having flexible runners and a steering gear of this particular character.

To the foregoing and other useful ends, the invention consists in matters hereinafter set forth and claimed and shown in the accompanying drawings, in which—

Fig. 1 is a perspective of a sled embodying the principles of the invention.

Fig. 2 is a perspective of a steering gear.

Fig. 3 is an enlarged detail section on line 3—3 in Fig. 1 of the drawings.

Fig. 4 is an enlarged cross section on line 4—4 in Fig. 1 of the drawings.

Fig. 5 is an enlarged detail section on line 5—5 in Fig. 2 of the drawings.

Figure 6:
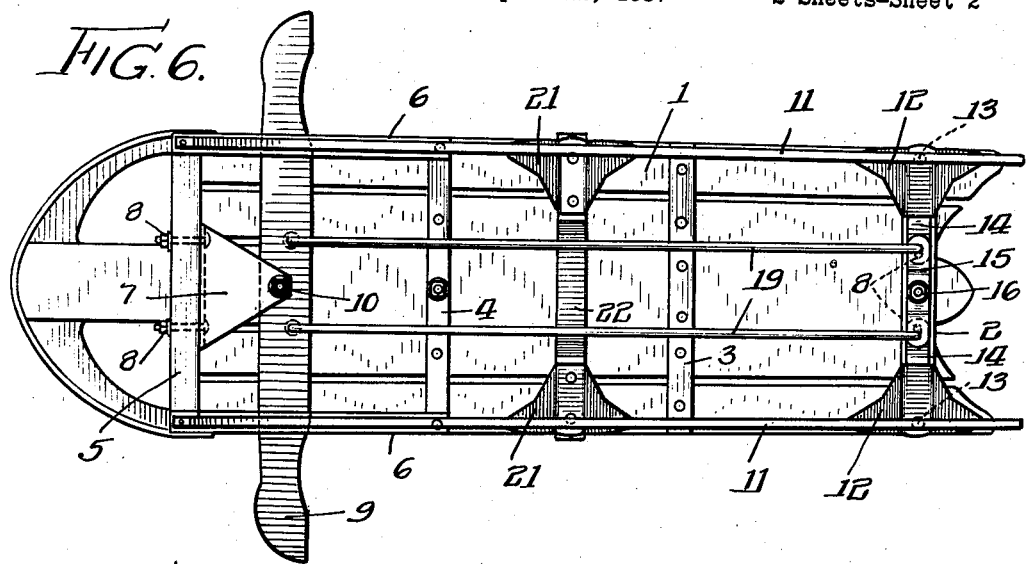
Fig. 6 is a bottom view of the said sled.

As thus illustrated, the invention comprises a sled body 1, provided with a rear transverse bar or cross-piece 2 secured to the underside thereof, at the rear of the body, and provided with a similar transverse stiffening bar 3 at the middle of the body. In addition, the front portion of the body is provided with transverse bars 4 and 5 on the under side thereof, and these bars are connected together by strips 6, which latter are spaced a distance from the under side of the flat body.

A sheet metal bracket 7 is preferably secured by bolts 8 to the rear side of the bar 5, to form a pivotal mounting at its rear end for the transverse steering bar 9, which is pivoted on said bracket by means of a bolt 10, as shown in Fig. 3 of the drawings.

Figure 7:
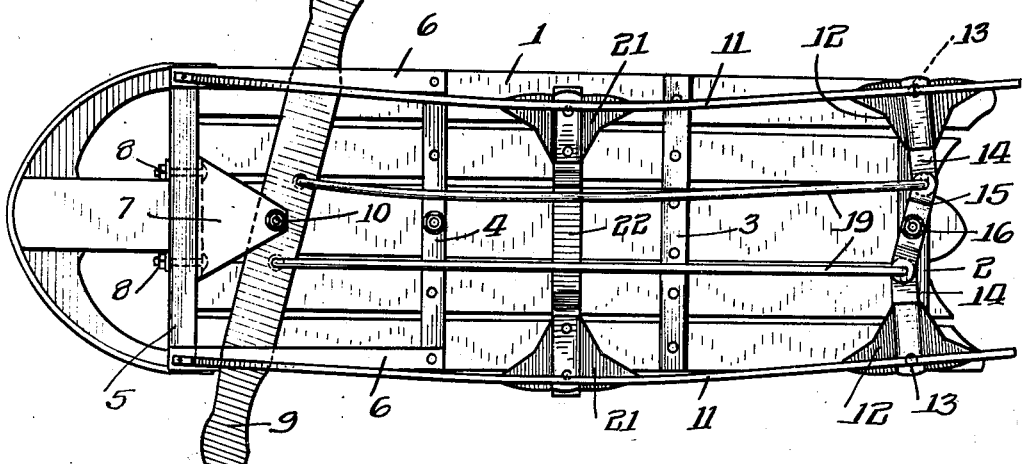
Fig. 7 is a similar view, showing the runners flexed in one direction.
Figure 8:
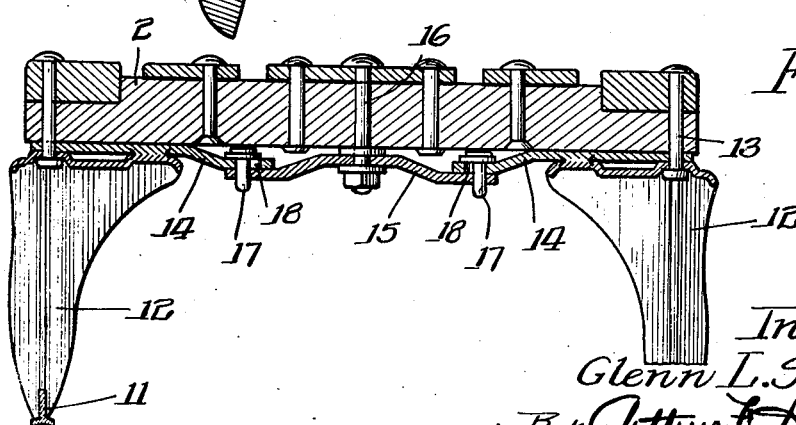
Fig. 8 is an enlarged transverse section on line 8—8 in Fig. 1 of the drawings.

The flexible steel runners 11 have their upturned front ends secured to the transverse bar 5, in any suitable or desired manner, and have their rear end portions provided with rigid brackets or legs 12, preferably made of sheet metal, and secured to the body by bolts 13, which form vertical pivots for these two brackets. Rigid arms 14, on the tops of these brackets, are connected together by a pivoted link 15, which latter is pivoted on the body by means of a vertical bolt 16, while the ends of this link 15 are pivotally connected with the arms 14 by bolts or pins 17, in the manner shown in Fig. 8 of the drawings. Slots 18 in the arms 14 provide for some lost motion as between these arms and the link 15, so that when the latter is skewed in one direction, as shown in Fig. 7 of the drawings, the two brackets 12 will be skewed in the other direction about their pivot bolts 13, previously mentioned. Preferably, the bolts or pins 17 are formed on the rear ends of parallel longitudinal rods 19 that have their front ends upturned and pivoted at 20 and 20 on the under side of the steering bar 9, previously mentioned. Thus, any skewing of the bar 9, in either direction, will produce a push and pull effect on the rods 19, so that the link 15 will be skewed as shown, for example, in Fig. 7, with the result that the two runners 11 will be flexed in the manner shown. Thus, the rear end portions of the runners are on vertical pivots, so that these rear end portions can be flexed to the right or the left, thereby serving to steer the sled.

Preferably, the intermediate portions of the runners are connected together by brackets or leg portions 21, that are rigid with the two runners, and that are secured to the under side of the bar 22, as shown in Fig. 4 of the drawings. This bar is preferably recessed at 23, on its under side, to provide clearance for the rods 19, previously mentioned. Thus, the runners themselves, when flexed, produce an endwise motion or displacement of the bar 22, as shown in Fig. 7 of the drawings, but in this way the two runners are practically spaced a fixed distance apart. The brackets or legs 21 can be made of sheet metal, as shown, or can be of any suitable form or shape.

In this way, the forward cross-bar of the steering gear is connected rearwardly to pivotal connection between the rear end portions of the runners and the under side of the body of the sled, with the result that the said rear end portions can be flexed to the right or the left, like rudders, to steer the sled.

It will be seen that the vertical axes of skewing motion for the rear portions of the runners intersect the runners, so that each axis is fixed relatively to the sled body.

It will be seen that the steering gear, of the construction shown and described, which is illustrative of the invention, is connected by means extending rearwardly to the rear end portions of the flexible runners, so that the steering gear has direct control over the said flexible runners at their rear ends, whereby in effect the sled is characterized by rear end steering.

It will be observed that the free middle portions of the runners 11 actually bow and shift laterally in one direction, when the rear ends of the runners are skewed in the opposite direction, the front ends of the runners being fixed, but their middle portions being free to be bowed and shifted laterally by the said lateral skewing or shifting of the extreme rear ends of the runners.

It will be seen that the link 15 serves to strengthen and brace the brackets 12 so that the latter are less likely to strain their mountings on the lower ends of the pivot bolts 13, when lateral strain or pressure is put on the runners, the center bolt 16 shown and described being made strong and heavy for this purpose. Moreover, it will be seen that the runners are left free to bow laterally, at their middle portions, and that each runner is practically free from restraint between its front and rear ends, so that the entire middle portion of each runner is free to bow laterally, in either direction, thereby to enhance the value of runners that provide rear end steering for the sled. Furthermore, it will be seen that by providing the link 15 between the two bracket arms 14, each rod 19 has steering control over both runners, so that duplicate action is insured for each runner. For example, either rod could be taken off or could break and drop off, and there would still be complete steering control over both runners, through the medium of the remaining rod. Thus, in actual use, with both rods in place, each rod not only has steering control over its allotted runner, but through the medium of the link 15 has complete steering control over the other runner as well.

It is important to observe that the front pivot 10 and the rear pivot 16 are directly in line longitudinally of the sled, and that the bars 9 and 15 constitute front and rear steering bars that are practically always parallel, so that the flexible runners are flexed or bowed laterally at their middle portions by the action of front and rear steering bars through the medium of pivotal link connection between the rear portions of the two runners.

What I claim as my invention is:

1. A sled body provided with laterally flexible runners, pivotal connection between the body and the rear portions of said runners, the front ends of the runners being secured and their middle portions being free to bow laterally, so that skewing the rear ends of the runners in one direction serves to bow and shift the middle portions laterally in the opposite direction, whereby the rear end steering is done with the flexible rear ends of the runners, and forward steering gear connected by rearwardly extending connecting means to said pivotal connection, and through the latter to the rear end portions of the runners, thereby for controlling the flexing of the runners, said pivotal connection comprising brackets rigid with the runners and pivoted on the under side of the rear portion of said body to each oscillate about a vertical axis, said brackets having arms extending toward each other, and a link having its ends pivotally connected to the ends of said arms and having its middle pivoted on the under side of said body.

2. A sled body provided with laterally flexible runners, pivotal connection between the body and the rear portions of said runners, the front ends of the runners being secured and their middle portions being free to bow laterally, so that skewing the rear ends of the runners in one direction serves to bow and shift the middle portions laterally in the opposite direction, whereby the rear end steering is done with the flexible rear ends of the runners, and forward steering gear connected by rearwardly extending connecting means to said pivotal connection, and through the latter to the rear end portions of the runners, thereby for controlling the flexing of the runners, said pivotal connection comprising brackets rigid with the runners and pivoted on the under side of the rear portion of said body to each oscillate about a vertical axis, said brackets having arms extending toward each other, and a link having its ends pivotally connected to the ends of said arms and having its middle pivoted on the under side of said body, and said steering gear comprising a cross bar pivoted at its middle to said body and connected by push and pull rods to said link at opposite sides of said middle pivot of the latter.

3. A sled body provided with flexible runners, pivotal connection between the body and the rear portions of said runners, for flexing the latter to the right or left, to bow the free middle portions of the runners laterally in either direction, a steering gear connected by rearwardly extending means to said pivotal connection, thereby for controlling the flexing of the runners, said pivotal connection comprising brackets rigid with the runners and pivoted on the under side of the rear portion of said body to each oscillate about a vertical axis, said brackets having arms extending toward each other, and a link having its ends pivotally connected to the ends of said arms and having its middle pivoted on the under side of said body, and steering gear connected to the ends of said link.

4. A sled body provided with flexible runners, pivotal connection between the body and the rear portions of said runners, for flexing the latter to the right or left, causing the free middle portions of the runners to bow laterally in either direction, a steering gear connected by rearwardly extending means to said pivotal connection, thereby for controlling the flexing of the runners, said pivotal connection comprising brackets rigid with the runners and pivoted on the under side of the rear portion of said body to each oscillate about a vertical axis, said brackets having arms extending toward each other, and a link having its ends pivotally connected to the ends of said arms and having its middle pivoted on the under side of said body, and said steering gear comprising a cross bar pivoted at its middle to said body and connected by push and pull rods to said link at opposite sides of said middle pivot of the latter.

5. A sled having flexible runners secured at their front ends, swiveled at their rear ends, and free to bow laterally at their middle portions, manual steering gear connected to the rear ends of said runners, to flex said ends laterally, the flexing of the rear ends in one direction serving to bow and shift said free middle portions laterally in the opposite direction, thereby to steer the sled, and guiding and bracing means connecting the swiveled portions of the runners together, serving to keep the axis of each swivel vertical, comprising a transverse pivotally movable connection between said rear ends, forming said guiding and bracing means.

6. A sled having flexible runners secured at their front ends, swiveled at their rear ends, and free to bow laterally at their middle portions, manual steering gear connected to the rear ends of said runners, to flex said ends laterally, the flexing of the rear ends in one direction serving to bow and shift said free middle portions laterally in the opposite direction, thereby to steer the sled, and guiding and bracing means connecting the swiveled portions of the runners together, serving to keep the axis of each swivel vertical, comprising a crank arm bracket forming a vertical pivot for each rear end, and means connecting one crank arm to the other.

7. A sled body provided with laterally flexible runners, pivotal connection between the body and the rear portions of said runners, with a vertical middle axis between the rear ends of the runners, the front ends of the runners being secured and their middle portions being free to bow laterally, so that skewing the rear ends of the runners in one direction serves to bow and shift the middle portions laterally in the opposite direction, whereby the rear end steering is done with the flexible rear ends of the runners, and forward steering gear having a vertical middle axis in line longitudinally with said first mentioned middle axis and connected by rearwardly extending connecting means to said pivotal connection, and through the latter to the rear end portions of the runners, thereby for controlling the flexing of the runners.

8. A structure as specified in claim 7, comprising a cross bar connected between the free middle portions of the runners, under the body, movable endwise by the two runners, when the latter are flexed laterally at their rear ends.

9. A structure as specified in claim 7, comprising a cross bar connected between the free middle portions of the runners, movable endwise by the latter, under the body, said bar being raised at its middle to provide clearance underneath for said connecting means.

10. A sled body provided with laterally flexible runners, pivotal connection between the body and the rear portions of said runners, for flexing the latter to the right or left, about vertical axes located on a transverse line, and with a vertical middle axis between the rear ends of the runners, so that rear end steering is done with the flexible rear ends of the runners, and forward steering gear connected by rearwardly extending connecting means to said vertical axis and said pivotal connection, and through the latter to the rear end portions of the runners, thereby for controlling the flexing of the runners, said steering gear comprising a forward cross bar pivoted at its middle to said body, forming a forward vertical middle axis in line longitudinally with said first mentioned middle axis, and connected under the body at two points on said line to said pivotal connection at the rear of said body.

11. A sled body provided with laterally flexible runners, pivotal connection between the body and the rear portions of said runners, providing a vertical axis for each runner, guiding and bracing means on the under side of the body to keep each axis vertical, the front ends of the runners being secured and their middle portions being free, so that skewing the rear ends of the runners in one direction serves to bow and shift the middle portions laterally in the opposite direction, whereby rear end steering is done with the flexible rear ends of the runners, pivotal link connection between the rear ends of the runners, providing a vertical middle axis, and forward steering gear having a vertical middle axis in line longitudinally with said first-mentioned middle axis and connected by rearwardly extending connecting push and pull members to said link connection, and to the rear end portions of the runners, thereby for controlling the flexing of the runners.

12. A sled having flexible runners secured at their front ends, swiveled at their rear ends, and free at their middle portions, providing a vertical axis for the rear portion of each runner, guiding and bracing means on the under side of the sled body to keep each axis vertical, and manual steering gear having a vertical middle axis and connected to the rear ends of said runners, a rear vertical middle axis in line longitudinally with said first-mentioned middle axis, the flexing of the rear ends of the runners in one direction serving to bow and shift said free middle portions laterally in the opposite direction, thereby to steer the sled.

13. A sled body provided with flexible runners, a link connection having a plurality of vertical axes and disposed between the rear ends of said runners, for steering purposes, an endwise movable cross bar disposed transversely under the middle portion of the sled body, means for securing the front and rear ends of the runners, and means for mounting the middle portions of the runners on said cross bar, whereby the middle portions of the runners are free to bow laterally in either direction, together with front steering gear connected to said link connection to cause the said bowing action thereof.

14. A sled body provided with flexible runners for steering purposes, a rigid transverse front bar at the front of the body, rigid with the latter, a metal bracket having front and upper and lower walls, means by which the front wall is bolted to the rear side of said cross bar, a transverse steering bar pivoted on the rear end of said bracket, between said upper and lower walls thereof, and means connecting said steering bar to the runners, thereby to flex the latter for steering purposes.

15. In a sled having flexible runners for steering, the combination of a sled body, a front vertical middle pivot thereon, a rear vertical middle pivot on said body, a front steering bar on said front pivot, a rear steering bar pivoted at its middle on said rear pivot, connections between the opposite ends of the rear steering bar and the rear end portions of the runners, and connecting means between the front steering bar and the said rear steering bar.

16. A structure as specified in claim 15, said runners having rear pivoted brackets provided with arms that pivotally engage said rear steering bar, and said rearwardly extending connecting means comprising rods having up-turned ends extending through the ends of said arms and also through the ends of said rear steering bar.

17. A structure as specified in claim 15, the rear portions of said runners having pivoted brackets formed with arms that pivotally connect with said rear steering bar, at the opposite ends of the latter, so that when the runners are flexed laterally at their middle portions the front and rear steering bars are parallel.

GLENN L. SHERWOOD.